United States Patent [19]

Brothers

[11] Patent Number: 5,135,577
[45] Date of Patent: Aug. 4, 1992

[54] COMPOSITION AND METHOD FOR INHIBITING THERMAL THINNING OF CEMENT

[75] Inventor: Lance E. Brothers, Ninnekah, Okla.

[73] Assignee: Halliburton Company, Duncan, Okla.

[21] Appl. No.: 609,342

[22] Filed: Nov. 5, 1990

[51] Int. Cl.$^5$ .......................... C04B 7/00; E21B 33/13
[52] U.S. Cl. .................... 106/724; 106/719; 166/293
[58] Field of Search ................ 106/724, 719; 166/293

[56] References Cited

U.S. PATENT DOCUMENTS

| | | | |
|---|---|---|---|
| 3,895,953 | 7/1975 | Mehta | 106/314 |
| 4,125,504 | 11/1978 | Mani et al. | 524/5 |
| 4,151,150 | 4/1979 | Peters et al. | 260/29.7 |
| 4,300,861 | 11/1981 | Vartiak | 405/270 |
| 4,436,850 | 3/1984 | Burdick et al. | 524/8 |
| 4,537,918 | 8/1985 | Parcevaux et al. | 524/130 |
| 4,551,261 | 11/1985 | Salihar | 252/88 |
| 4,676,317 | 6/1987 | Fry et al. | 166/293 |
| 4,691,774 | 9/1987 | Nelson | 166/291 |
| 4,721,160 | 1/1988 | Parcevaux et al. | 166/293 |
| 4,935,060 | 6/1990 | Dingsoyr | 106/719 |

Primary Examiner—William R. Dixon, Jr.
Assistant Examiner—Sue Hollenbeck
Attorney, Agent, or Firm—Thomas R. Weaver

[57] ABSTRACT

The invention relates to cement compositions and methods of use for cementing oil and gas and/or geothermal wells which reduce thermal thinning of slurries at elevated downhole temperatures. To combat thermal thinning, latex is added to a cement slurry without a latex stabilizing surfactant resulting in a slurry having low mixing viscosity and good solids suspension properties at downhole temperatures.

16 Claims, No Drawings

COMPOSITION AND METHOD FOR INHIBITING THERMAL THINNING OF CEMENT

This invention relates to cementing the annulus of oil and gas and geothermal wells. More particularly, the invention relates to a cement composition which combats thermal thinning of the cement slurry at high downhole temperatures. The invention especially concerns cementing systems which employ latex to reduce the tendency of cement slurries to settle out solid components.

BACKGROUND OF THE INVENTION

There are many examples in the prior art of latex mixed with cement For example, latex is a popular cement additive in the construction industry. The addition of latex enhances the strength and bonding properties of the cement and is used to construct crack-free structures Latex is also added in oil well cementing applications. Latex cement is used for plugging casing leaks, low pressure squeeze cementing jobs, and is recommended for "tailing in" on primary cementing jobs. Craft, Holden and Graves, Well Design: Drilling and Production, p. 200 (Prentice-Hall, Inc. 1962). Latex cement is known for its excellent fluid loss properties, its excellent resistance to contamination and its high bonding strength. Carl Gatlin, Petroleum Engineering: Drilling and Well Completions, p. 272 (Prentice-Hall, Inc. 1960).

The addition of latex to oil well cements improves the impact strength, flexural strength and pressure resistance properties of the cement. The addition of latex can prevent premature dehydration of a cement slurry for better "squeeze jobs." In recent years, latex has been added to oil well cements to inhibit gas migration or gas channelling during the setting of a cement slurry. Light weight latex cements have also been developed to inhibit gas channelling.

SUMMARY OF THE INVENTION

The present invention relates to the addition of small amounts of latex to a cement slurry so that under high downhole temperatures the latex will gel the slurry to the extent that solids, i.e., cement, sand, weight materials, etc., will not settle out. Unlike prior art methods of using large amounts of latex and latex stabilizing surfactants, this invention relates to the use of a small amount of latex without additional surfactants to stabilize the latex.

The objective of the present invention has the latex emulsion inverting or breaking downhole thereby providing the necessary viscosity and gel strength to inhibit thermal thinning and to keep solids suspended in the cement slurry. Prior uses of latex in oil well cements utilized a latex stabilizer to prevent the latex emulsion from inverting. Unlike the present invention, the latex emulsion of the prior art would still be intact after the cement set. The latex emulsion of the present invention inverts at downhole temperatures and coagulates forming rubber-like particles which increase the viscosity and gel strength of the cement slurry. The present invention requires no additional viscosifying agents to prevent solids from settling.

The cement compositions of the present invention normally contain lower concentrations of latex than the oil well cement compositions in the prior art. Large amounts of latex without a latex stabilizing surfactant will cause a cement composition to gel too quickly making the slurry unpumpable. The latex in the present invention, unlike the recent advances in latex cements, is not added to control gas channelling. The primary purpose of the addition of latex is to control thermal thinning.

It has been discovered that latex causes a cement slurry to gel and inhibit thermal thinning when added without a surfactant or stabilizer. The resulting slurry has low surface mixing viscosity and good solids suspension properties at downhole temperatures. Thus, even though latex has previously been used in oil well cementing, it has not been used to prevent thermal thinning.

DESCRIPTION OF INVENTION

A serious problem in designing cement slurries for use in high temperature oil and gas and/or geothermal wells involves thermal thinning. It is difficult to formulate a slurry which has a low mixing viscosity at the surface, yet is viscous enough at high bottom hole temperatures to suspend cement solids.

The present invention resides in a cement system designed to meet this problem. Thermal thinning occurs as a cement slurry is exposed to increasing downhole temperatures. The higher temperatures cause slurry formulations to display unacceptably low yield point values. As known to those skilled in the art, yield point is the amount of shear stress or pressure that must be exceeded to initiate movement of a fluid. Yield point is an indication of the suspension properties of a fluid. As the yield point decreases, the slurry's ability to suspend solids also decreases, causing the cement solids to settle and thereby jeopardize the quality and effectiveness of the cement job.

The present invention is directed to wells which possess bottom hole static temperatures greater than about 230° F. (110° C.) and bottom hole circulating temperatures greater than about 150° F. (65° C.). In implementing the invention, latex is added to a cement slurry to inhibit thermal thinning. Latex causes cement slurries to gel as they are heated, but stabilizing surfactants must not be added. The result is the formulation of a slurry with low mixing viscosity at surface conditions and good solids suspension properties at elevated downhole temperatures.

Suitable latices for use in the present invention are styrene-butadiene and polyvinyl acetate. The preferred latex is styrene (10-90% by weight)/butadiene (90-10% by weight). It is to be understood that the styrene/butadiene latice described above is generally commercially produced as a terpolymer latex and the definition of the latex as used herein also is intended to include such terpolymer latices which may include from about 0 to 3% or more by weight of a third monomer. The third monomer, when present, generally is anionic in character and may have a carboxylate, sulfate or sulfonate group. Other groups that may be present on the monomer include phosphates, phosphonates or phenolics. Latex latices of the type described above are commercially available from, for example, Unocal Chemicals Division of Unocal Corporation, Chicago Ill. or Reichhold Chemicals, Inc., Dover Del.

Styrene-butadiene is a synthetic latex produced by emulsion polymerization techniques. Without a stabilizing agent or surfactant for the emulsion, the styrene-butadiene emulsion breaks down or inverts at elevated downhole temperatures. Once the emulsion breaks, the styrene-butadiene is released and begins to coagulate or coalesce until a rubber-like polymer is created within the cement. This coalescence of the styrene-butadiene provides the downhole viscosity and gel strength needed to suspend solids within the cement slurry. Previous use of styrene-butadiene latex in conventional oil well cements has included a protective stabilizer or surfactant to keep the emulsion from inverting at increased temperatures. However, such an inversion of the styrene-butadiene emulsion is the desired goal of the present invention.

The cement slurries of the present invention are comprised of the following components: cement, water, latex and other common cement additives required for particular applications. The composition, however, does not include a surfactant or stabilizer for stabilizing the latex.

A preferred embodiment of the invention utilizes styrene-butadiene latex without stabilizing surfactants to provide gel strength at high bottomhole temperatures to a cement slurry. Another embodiment of the invention utilizes polyvinyl acetate latex. The styrene-butadiene latex may be added to the cement mix water as a liquid additive in weight ratios of about 10% to 90% styrene and about 90% to 10% butadiene. An especially preferred embodiment is a weight ratio of about 50/50 styrene to butadiene.

The amount of styrene-butadiene latex to be added to a cement slurry will be a function of the surface mixing viscosity of the slurry. The surface mixing viscosity of the slurry will be affected by a variety of factors such as the density and solids content of the slurry and the amounts and types of cement additives found in the slurry. The higher the surface viscosity of the cement slurry, the less latex is required to inhibit the downhole thermal thinning effect. Conversely, the lower the surface mixing viscosity of the cement slurry, the more latex is required. In general, the amount of latex added to the cement slurry is between about 0.8% and 8.8% by weight of dry cement. The styrene-butadiene latex may be added in liquid form. The corresponding amount of liquid latex to be added is between about 0.1 gallon and about 1.0 gallon per sack of cement. Test operations may be performed at the surface to determine the best formulations for any particular cement system.

The cement itself may be taken from any class of hydraulic cements commonly used for cementing oil and gas and geothermal wells. The term "hydraulic cement" is understood in the art to mean cements which comprise compounds of calcium, aluminum, silica, oxygen and/or sulfur and which set and harden by reaction with water. These include cements commonly called "Portland cements", such as ordinary, rapid or extra-rapid hardening Portland cements, or sulfate-resisting cement and other modified Portland cements; cements commonly referred to as aluminous cements, calcium aluminate cements with high alumina content; and similar cements further containing small amounts of accelerators or retarders or air-entraining agents, as well as Portland cements containing secondary extender constituents like fly ash, pozzolan and the like.

The cement composition of the present invention utilizes a salt-containing water. Sodium chloride (NaCl) water with NaCl concentrations from about 10% by weight of water up to saturation (i.e., about 37.2% by weight of water) is used in preferred embodiments of this invention. Another embodiment of this invention utilizes potassium chloride salt. The amount of salt to be added to a cement composition is a function of the lithology of a particular well. Where clay stabilization is a problem, NaCl may be added at concentrations of 18% or less to inhibit clay swelling. The presence of salt formations may require a salt saturated cement in order to increase the bonding strength of the cement slurry. It has been discovered that the presence of salt in the cement slurry aids the inversion of the styrene-butadiene emulsion at elevated downhole temperatures. Depending upon the particular cement slurry being formed and the well conditions, the salt-containing water is utilized in the cement slurry in an amount in the range of from about 20 to about 200% by weight of dry cement.

It is well known in the field of cementing oil and gas and geothermal wells that the cement slurry must be tailored to meet the particular conditions of each well. Therefore, desired slurry properties such as thickening time, pump time, rheology, fluid loss control, free water content, etc., are maintained by cement additives. Likewise, the cement composition of this invention may include cement additives. Common cement additives include retarders, extenders, weight materials, fluid loss control additives, silica flour and defoamers. Surfactant type defoamers may be employed, but very small quantities (less than about 0.25%) will normally be adequate and acceptable without adversely affecting the styrene-butadiene emulsion.

Since this invention relates to cement compositions that inhibit thermal thinning at high downhole temperatures, a particular slurry may contain silica flour or a coarser grind silica sand. Silica flour, as well as silica sand, is added to Portland cement to stabilize the cement for use at temperatures above 230° F. (110° C.). Portland cement hydrates at an accelerated rate at temperatures above 230° F. producing a greatly enlarged reaction product which results in an increased permeability accompanied by strength loss. Thus, silica flour is added to inhibit strength retrogression. Silica flour is added to Portland cement at a rate of about 30 to 40% by weight of dry cement.

Retarders may be used to extend the pumping time of a slurry to assure ample time to mix the slurry and place it in the annulus. The amount of retarder needed for a particular cement job will depend upon the bottom hole circulating temperature, the required pumping time, the basic cementing material and the water ratio. Common retarders include calcium lignosulfonate, carboxymethyl hydroxyethyl cellulose (CMHEC), organic acids and borax.

Weighting materials may be added to cement slurries when increased hydrostatic head is needed to contain formation pressures. The most common weighting materials are barite and hematite.

Extenders may be used to reduce the hydrostatic pressure across weak formations and to reduce the cost of large cement jobs. Examples of commonly used extenders include pozzolans, bentonite, gilsonite and water.

Fluid loss additives help to prevent filtrate loss across permeable formations and to control rate of loss during squeeze applications. Filtration control helps to prevent dehydration of the slurry and premature setting of the cement. A preferred embodiment of the cement compositions of this invention include a grafted lignite fluid loss additive in amounts adequate for that purpose.

The only known cement additive that should be excluded from the cement composition of this invention is naphthalene sulfonic acid condensed with formaldehyde, a dispersant, which causes excessive viscosity when added to high salt containing cement slurries.

The cement compositions of this invention are useful for remedial squeeze cementing jobs or primary cementing of casings and liners at elevated temperatures. The addition of latex without the usual surfactants or stabilizers to the cement provides gel strength at high bottomhole temperatures, thus inhibiting solids from settling out of the slurry. Embodiments of this invention have been successfully used in wells with bottomhole temperatures of 450° F. (232° C.).

The cement compositions of this invention are particularly useful for remedial squeeze cementing through small diameter tubing, drillpipe or coiled tubing. Such applications require sufficient slurry viscosity to suspend solids at elevated downhole temperatures, yet low enough surface viscosity so as not to develop excessive friction pressures when pumping or displacing the cement slurry downhole. Thus, cement compositions of this invention maintain reduced frictional pressures when pumping through small diameter tubing.

A preferred embodiment of the cement compositions of this invention includes Class H Portland cement, styrene-butadiene latex, NaCl mix water, silica flour and a grafted lignite fluid loss additive (such as disclosed in U.S. Pat. No. 4,676,317, the entire disclosure of which is incorporated herein by reference) in the following ranges of concentrations: 18.8 lb/sk NaCl (one sk is 94 lbs of cement), 35% silica flour, 3% by weight of cement grafted lignite, 0.45 gal/sk styrene-butadiene latex, 5.9 gal water/sk, and sufficient cement retarder to allow adequate job placement time.

An especially preferred embodiment of the cement composition of this invention includes styrene-butadiene latex with a weight ratio of 50/50 styrene to butadiene.

In order to facilitate a clear understanding of the methods and compositions of this invention and not by way of limitation, the following Examples are provided.

EXAMPLES

A way to determine whether a slurry has low mixing viscosity, yet is viscous enough at high temperature to suspend cement solids is to measure a slurry's yield point at 80° F. (26.7° C.) and 190° F. (87.8° C.). The yield point is measured by a Fann viscometer. Measurements are taken at 300 and 600 rpm. The plastic viscosity of the cement slurry is equal to the 600 rpm reading minus the 300 rpm reading. The yield point is equal to the 300 rpm reading minus the plastic viscosity.

The following tests were conducted:

(1) Class H cement was mixed with 18.8 lb/sk NaCl, 35% silica flour, 0.5% calcium lignosulfonate retarder, 3% grafted lignite fluid loss additive, and sufficient water to arrive at a 16.2 lb/gal cement slurry.

| (50/50 Styrene-Butadiene Latex) gal/sk | 80° F. Yield Point (lb/100 ft²) | 190° F. Yield Point (lb/100 ft²) |
| --- | --- | --- |
| 0.45 | 40 | 44 |
| 0 | 18 | negative value |

(2) Additional tests were conducted with varying amounts of the above additives as shown in Table 1. For all testing, cement and silica flour were dry blended. All other additives were added to the mix water in the following order: NaCl, defoamer, latex: 50/50 styrene-butadiene, calcium lignosulfonate retarder, grafted lignite fluid loss additive.

As shown by the yield point values at 190° F., compositions and methods in accordance with the present invention provide a cement composition with improved thermal thinning properties.

TABLE 1

DATA
Properties of Latex Containing Salt Cement Slurries
Class H Cement, 35% SSA-1, 16.2 lb/gal

| NaCl (lb/sk) | Mix Water (gal/sk) | Latex (gal/sk) | Retarder (% by Wt. of Cmt) | Fluid Loss Additive (% by Wt. of Cmt) | 80° F. Fann Data | | | | 190° F. Fann Data | | | |
| --- | --- | --- | --- | --- | --- | --- | --- | --- | --- | --- | --- | --- |
| | | | | | 600 | 300 | PV | YP | 600 | 300 | PV | YP |
| 18.0 | 5.2 | 1.1 | 0.5 | 0 | 140 | 87 | 53 | 34 | Gelled | | | |
| 18.0 | 5.8 | 0.56 | 0.5 | 0 | 107 | 58 | 49 | 9 | 384 | 230 | 154 | 76 |
| 18.0 | 5.2 | 1.0 LA-2 | 0.5 | 0 | 294 | 180 | 114 | 66 | 102 | 58 | 44 | 14 |
| 18.8 | 6.1 | 0.22 | 0.5 | 3 | 291 | 157 | 134 | 23 | 130 | 68 | 62 | 6 |
| 18.8 | 5.9 | 0.45 | 0.5 | 3 | 336 | 188 | 148 | 40 | 214 | 129 | 85 | 44 |
| 18.8 | 6.3 | 0 | 0.5 | 3 | 254 | 136 | 118 | 18 | 86 | 42 | 44 | — |
| 18.8 | 5.9 | 0.45 | 0.8 | 3 | 340 | 190 | 150 | 40 | 155 | 90 | 65 | 25 |
| 18.8 | 5.9 | 0.45 | 1.2 | 3 | 336 | 184 | 152 | 32 | 122 | 66 | 56 | 10 |
| 18.8 | 5.9 | 0.45 | 1.0 | 3 | 300 | 166 | 134 | 32 | 162 | 92 | 70 | 22 |
| 18.8 | 5.9 | 0.45 | 0.9 | 3 | 350 | 196 | 154 | 42 | 176 | 104 | 72 | 32 |
| 18.8 | 5.9 | 0.45 | 0.2 HLX-C412 | 3 | 346 | 200 | 146 | 54 | 168 | 100 | 68 | 32 |

PV = Plastic Viscosity
YP = Yield Point
LA-2 = Polyvinyl acetate latex
HLX-C412 = Retarder

What is claimed is:

1. A method of increasing the viscosity and gel strength of a slurry comprised of hydraulic cement in water said method comprising
   admixing with said slurry a quantity of latex to produce a latex-containing slurry and thereafter
   subjecting said latex-containing slurry to a temperature sufficient to cause said latex to invert to thereby produce an increase in the viscosity and gel strength of said slurry;
   wherein said slurry does not contain a surfactant to stabilize said latex and further wherein said latex is selected from the group consisting of styrene-butadiene latices and polyvinyl acetate latices.

2. The method of claim 1 wherein said latex is present in said slurry in an amount in the range of from about 0.8% to about 8.8% latex by weight of dry cement in said slurry.

3. The method of claim 2 wherein said latex is a styrene-butadiene latex with styrene and butadiene units in weight ratios ranging from about 10 to 90 to about 90 to 10.

4. The method of claim 2 wherein said temperature is greater than about 230° F. and up to about 450°.

5. The method of claim 3 wherein said slurry further comprises salt.

6. The method of claim 5 wherein said salt is sodium chloride present in said water in concentrations from about 10% by weight of water up to saturation.

7. The method of claim 6 wherein said latex is a styrene-butadiene latex having a styrene to butadiene weight ratio of about 50 to 50.

8. The method of claim 3 wherein said slurry is placed in a well and therein subjected to said temperature sufficient to cause said latex to invert.

9. The method of claim 8 wherein said slurry further comprises sodium chloride present in said water in concentrations from about 10% by weight of water up to saturation.

10. The method of claim 9 wherein said latex is a styrene-butadiene latex having a styrene butadiene weight ratio of about 50 to 50.

11. The method of claim 10 wherein said cement is Portland Cement and said temperature is greater than about 230° F.

12. The method of claim 11 wherein said slurry further comprises silica flour present therein in an amount in the range of from about 30% to about 40% silica flour by weight of dry cement in said slurry.

13. A method of cementing a well penetrating a subterranean formation having a high bottom hole temperature said method comprising
    introducing into the annulus space between said formation and a conduit suspended therein a slurry comprised of Portland Cement, water and a styrene-butadiene latex, wherein said slurry does not contain a surfactant to stabilize said latex; and
    permitting said latex to invert in the presence of said high bottom hole temperature to thereby increase the viscosity and gel strength of said slurry.

14. The method of claim 13 wherein said latex is present in said slurry in an amount in the range of from about 0.8% to about 8.8% latex by weight of dry cement in said slurry.

15. The method of claim 14 wherein the weight ratio of styrene to butadiene in said latex is about 50 to 50 and said slurry further comprises sodium chloride present in said water in concentrations from about 10% by weight of water up to saturation.

16. The method of claim 15 wherein said bottom hole temperature is greater than about 230° F. and said slurry further comprises silica flour present therein in an amount in the range of from about 30% to about 40% silica flour by weight of dry cement in said slurry.

* * * * *